Jan. 12, 1926.
R. C. COLLEY
1,569,173
CONTINUOUS AUTOMATIC LATITUDE AND LONGITUDE INDICATOR
Filed Nov. 27, 1923     2 Sheets-Sheet 1

R.C. Colley  Inventor
By  Jesse R. Stone
His Attorney

Jan. 12, 1926.  
R. C. COLLEY  
1,569,173  
CONTINUOUS AUTOMATIC LATITUDE AND LONGITUDE INDICATOR  
Filed Nov. 27, 1923   2 Sheets-Sheet 2
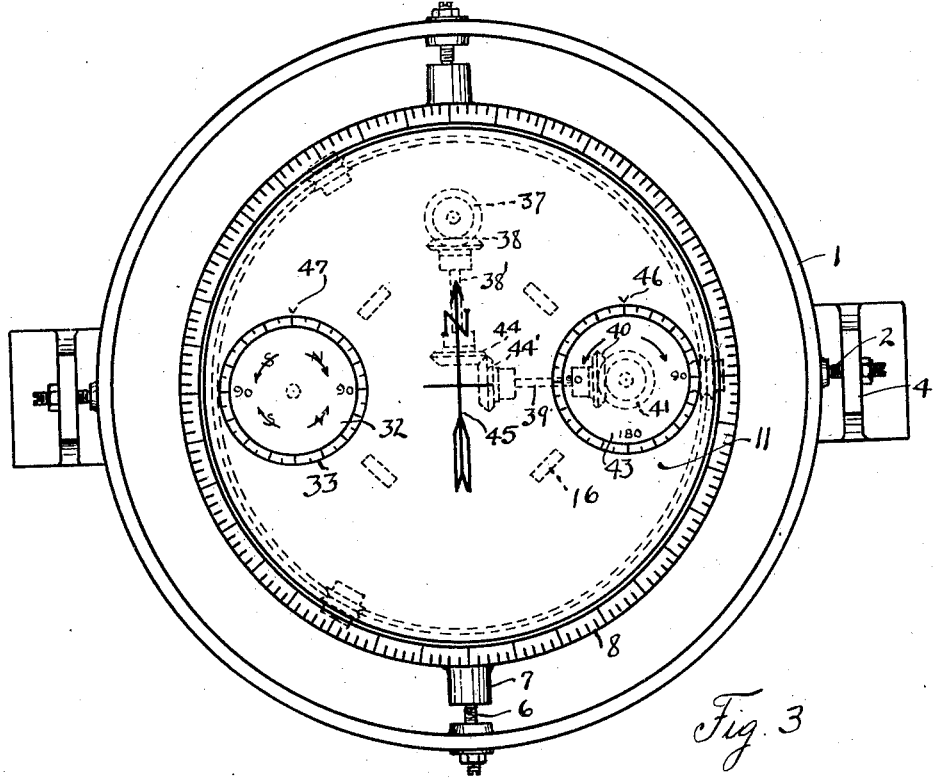
Fig. 3
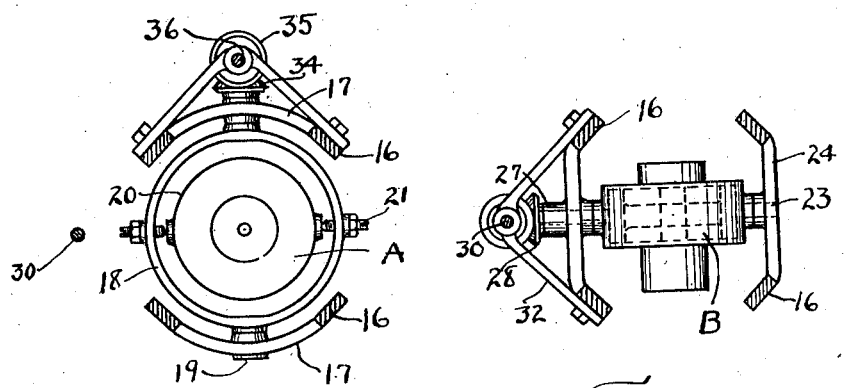
Fig. 4
Fig. 5
R.C. Colley  Inventor
By Jesse R. Stone
His Attorney Patented Jan. 12, 1926.

1,569,173

UNITED STATES PATENT OFFICE.

REGINALD C. COLLEY, OF HOUSTON, TEXAS.

CONTINUOUS AUTOMATIC LATITUDE AND LONGITUDE INDICATOR.

Application filed November 27, 1923. Serial No. 677,238.

*To all whom it may concern:*

Be it known that I, REGINALD C. COLLEY, a citizen of the United States, residing at Houston, Harris County, Texas, have invented a certain new and useful Improvement in Continuous Automatic Latitude and Longitude Indicators, of which the following is a specification.

My invention relates to devices for automatically indicating position of a ship or other means of conveyance in terms of latitude and longitude. The device is intended for use on vessels at sea, on airships or on land vehicles.

An object is to provide a device of this character which will indicate the position of the observer in positive readings unaffected by electricity or magnetic attraction.

It is another object to automatically register latitude, longitude and the points of the compass on a dial or dials independently of wind or tide or of the means of propelling the vessel.

Figure 1:
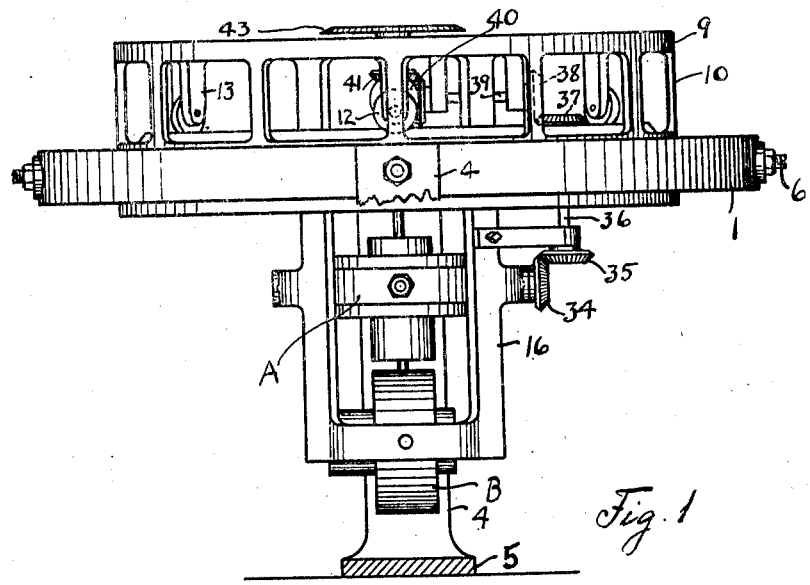
Figure 2:
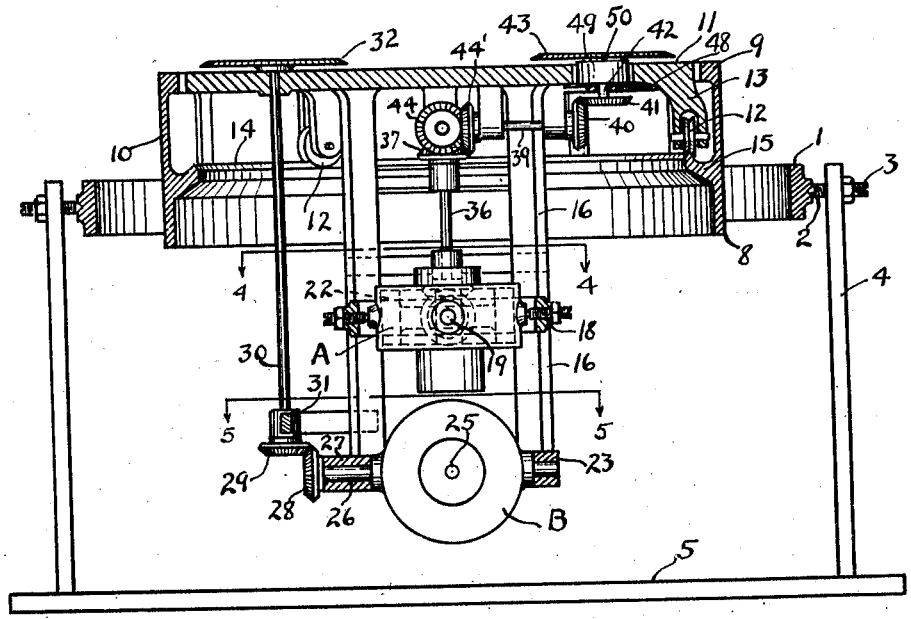

A preferred embodiment of my invention is shown in the drawing wherein Fig. 1 is a side elevation of the device, certain parts being broken away. Fig. 2 is a central vertical section, certain parts being in elevation. Fig. 3 is a top plan view. Figs. 4 and 5 are transverse sections on the planes 4—4 and 5—5 respectively of Fig. 2. Like numerals of reference are applied to like parts in all the views.

My invention depends for its operation upon the fact that a gyroscope, when mounted so that it is free to do so, will maintain itself rigidly in the exact plane in which it is set when rotation is begun. Therefore if a gyroscope is set, when in port, so that its axis is exactly vertical, movement of the vessel from that point to the east or west will cause the axis to vary from the vertical and this variation may, as compared with the true vertical in the new position, be used to indicate longitude. Furthermore, if a second gyroscope is set with its axis at right angles to the vertical, and pointing north and south, it will maintain itself in that plane and any movement of the vessel to the north or the south from the original position will cause the axis of the gyroscope to vary from the true horizontal and this variation may be used to indicate latitude.

In the drawing, I show a main supporting gimbal made up of an outer ring 1, supported pivotally at opposite sides at 2 on adjustable pins 3 mounted in the upper ends of posts 4, of such height as to hold the complete device free to swing clear of the base 5.

The central ring of this main gimbal is free to rock on an axis comprising opposite adjustable pins 6 in the outer ring, positioned at points 90° from the axis 3, and fitting in opposite trunnions 7 on the inner ring 8.

Said ring 8 has above it a ring 9 supported in spaced relation therefrom by posts 10 at intervals around the ring 8. Ring 9 has graduations marked thereon to indicate degrees of the circle.

Placed on the level of the ring 9 is a rotatable circular table or plate 11 spaced slightly from said ring. Said plate is mounted on three rollers 12 having bearings on legs 13, spaced 120° apart and extending downwardly from the table. The rollers 12 have a grooved periphery adapted to roll on an annular track 14 formed on an integral inwardly projecting flange 15 on the ring 8.

Depending centrally from the table 11 are four supporting posts 16. As shown in Fig. 4, these posts being connected together at a point spaced downwardly from the table by means of sector shaped plates 17— 17 which serve to support a gimbal by means of which the gyroscope A is suspended. The supporting gimbal is made up of a ring 18, pivotally supported on an axis 19, rotatable in bearings in the plate 17, and an inner ring 20 is supported upon the ring 18 on axes made up of adjustable pins 21 spaced at points 90° from the axes 19.

The ring 20 is more properly a housing for the gyroscope A, which may be of any preferred form; and I contemplate using an electric motor having a ring 22, shown in dotted lines in Fig. 2, rotatable about a central field. This motor may be connected up with a source of electric current in any desired manner, one pole being grounded on the frame, and the other being insulated from the frame and connected with a source of electricity.

These supporting posts or legs 16 are extended below the plates 17 to provide a hanger for a second gyroscope B. This gyroscope is similar in construction to the one just described and is mounted in opposite bearings 23 in plates 24 connecting two pairs of the legs 16. This gyroscope is intended to rotate in a vertical plane, or, in other words, it is rotated upon an axis 25 which may be placed in a horizontal position pointing due north and south. The axis 26 of the ring upon which the gyroscope is supported projects laterally from one of the bearings 23 and has on the end thereof a bevel gear 28 adapted to mesh with a similar bevel gear secured at the lower end of a vertical shaft 30, supported at said lower end in a bearing 31 formed on a bracket 32, connected with the frame work. The upper end of the shaft 30 projects through table 11 and is secured centrally to the lower face of a rotatable disk 32 which is graduated at 33 to act as a sort of dial to automatically indicate latitude.

The gyroscope A, as will be noted, is adapted to rotate on a vertical axis and thus maintain the rotating motor in a fixed position which will be horizontal at the time it is set. The outer ring 18 has for its axis at one end a shaft projecting beyond the plate 17 and having a bevel gear 34 thereon. The gear communicates rotation through a bevel gear 35 on shaft 36 and bevel gears 37 and 38, shaft 38', bevel gears 44 and 44' shaft 39, gears 40 and 41 to vertical shaft 42 which is mounted in bearings 48 below the table 11 and has secured on the upper end thereof a housing 49 containing a 24 hour self winding clock the central indicator shaft 50 of which has thereon a dial plate 43 graduated to indicate degrees of longitude.

The table 11 is marked centrally thereof with an arrow 45 parallel with the axis 25 of the gyroscope B which is intended to ordinarily point north and south. It is therefore obvious that when once set in a north and south position, the action of the gyroscope A will maintain it in that position thereafter.

In the operation of this device, the table 11 and the axis 25 of the gyroscope B will be positioned to point exactly north and south, the arrow being lettered to indicate which is north. Due to the weight of the suspended gyroscope, the framework will depend from the table in a vertical position and the axis of the gyroscope A may be set in a position exactly vertical. If the gyroscopes are then started, their rotation will hold them exactly in the plane in which they are thus set. If then, the ship, upon which the device is mounted, journeys from the port where the device was thus set, the table 11 and the framework made up of the supporting legs 16 with the apparatus thereon will always tend to maintain a position with the table horizontal and the posts 16 in a vertical position. The position of the gyroscopes A and B will however not vary and they will not again adjust themselves from their original positions.

If the ship journeys due east or west from the original position, the gyroscope A will soon have its axis pointing slightly away from the vertical due to the spherical form of the earth's surface, The axis formed at 19 will therefore rotate slightly relative to the plates 17 and this rotation will be communicated through the shafts and gears previously described to the dial 43. This dial is so marked and graduated that its rotation relative to a certain zero point 46 will automatically show the longitude in direct reading from the dial. It is understood, of course, that the gears by means of which the rotation is communicated to the dial will be so calibrated that this reading will be absolutely accurate.

When the ship proceeds either north or south from the original position, the axis 25 of the gyroscope B will no longer be exactly horizontal from the fact that it maintains itself in the position that was horizontal at the point from which it started. This variation of the horizontal as maintained by the table 11 relative to the original horizontal position, as maintained by the axis 25 of the gyroscope B, will cause the shafts 26 and 30 to rotate, thus moving the dial 32 from its original position and this movement relative to the point 47 will show the exact latitude in which the ship finds itself.

The central axis 50 of the clock is set to rotate once in 24 hours and in the proper direction to correct the reading of the dial 43 in which variation would otherwise occur due to the rotation of the earth. For, as the gyroscope for longitude is mounted with its axis at right angles to the axis of the earth, it will remain in this position without change and it is apparent that, as the gyroscope tends to maintain its original plane, it will appear to rotate completely once in 24 hours. Thus, if the gyroscope is started at a certain hour, on a certain meridian; as the earth rotates eastwardly the gyroscope will appear to turn to the west to make one complete revolution in 24 hours, altho it will be plain that it is not in reality rotating at all. This relative rotation of the gyroscope as compared with the earth, would turn the axis 19 and the clock housing one complete turn in 24 hours and this movement is automatically corrected by the clock's rotation of shaft 50 and the dial synchronously with the earth's rotation.

It will be obvious that this device will indicate the exact latitude or longitude of the support upon which the device is carried independently of any external influences aside from the force of gravity. It will therefore be adaptable for use on ships or submarines at sea or for aeroplanes flying in the clouds. It has, in fact, a universal application wherever it becomes desirable to ascertain the exact position of the observer upon the earth's surface.

The further objects and advantages will be apparent to one skilled in the art without further description.

What I claim as new and desire to protect by Letters Patent is:

1. In a device of the character described, a support a gimbal pivoted on said support, a table mounted in said gimbal, posts depending from said table, a gimbal mounted on said posts, a gyroscope supported thereon to rotate on a vertical axis, a ring on said posts pivotally supported on a horizontal shaft, a gyroscope supported in said ring to rotate on a horizontal axis, dials on said table, and operative connections between outer axis of said gyroscope gimbal and one of said dials and between said shaft and the other of said dials in the manner described.

2. In a device of the character described, a support a gimbal pivoted on said support, a table mounted on said gimbal, posts depending from said table, a gimbal supported on said posts, a gyroscope on said gimbal adapted to rotate on a vertical axis, a dial on said table graduated to indicate longitude, and operative connections between the outer axis of said gyroscope gimbal and said dial whereby the rotation of said outer axis will be communicated to said dial for the purpose described.

3. In a device of the character described, a gimbal, a table supported rotatably in said gimbal whereby it may be maintained in a horizontal position, posts depending from said table, a ring journalled on a shaft supported horizontally in said posts, a gyroscope mounted in said ring to rotate on a horizontal axis, a dial on said table graduated to indicate latitude, and operative connections between said shaft and said dial whereby the rotation of said shaft will be communicated to said dial for the purpose described.

4. In a device of the character described, a support a gimbal on said support, a table rotatably mounted in said gimbal, posts depending from said table, a horizontal shaft journalled in said posts, a housing on said shaft, a gyroscope in said housing adapted to rotate on a horizontal axis at right angles to said shaft, a latitude indicating dial on said table, and operative connections between said shaft and said indicating dial whereby rotation of said shaft will be communicated to said dial.

5. In a device of the character described, a support, a gimbal pivoted thereon, a table supported in said gimbal, supporting posts depending from said table, longitude indicating means on said table, a gyroscope mounted in said posts to rotate on a vertical axis and adapted to maintain itself rigidly in its original plane of rotation, and connecting means between the frame of said gyroscope and said indicating means whereby variation of the said vertical axis and the true vertical caused by changes in longitude will be registered on said indicating means.

6. In a device of the character described, a support, a gimbal, a frame including supporting posts mounted in said gimbal to maintain said posts by gravity in a vertical position, a ring supported on a horizontal shaft having bearings in said posts, a housing in said ring adapted to be rotated on a horizontal axis at right angles to said shaft, a table on said posts, a latitude indicating device and operative connections between said shaft on said table and said indicating means whereby the rotation of said shaft will operate said indicating means.

In testimony whereof I hereunto affix my signature this 24 day of November, A. D. 1923.

REGINALD C. COLLEY.